US005548702A

United States Patent [19]
Li et al.

[11] Patent Number: 5,548,702
[45] Date of Patent: Aug. 20, 1996

[54] SCROLLING A TARGET WINDOW DURING A DRAG AND DROP OPERATION

[75] Inventors: Shih-Gong Li; Theodore J. L. Shrader, both of Austin, Tex.

[73] Assignee: International Business Machines Corporation, Armonk, N.Y.

[21] Appl. No.: 174,507

[22] Filed: Dec. 23, 1993

[51] Int. Cl.[6] .................................................. G06F 3/14
[52] U.S. Cl. ................................... 395/155; 395/157
[58] Field of Search ................................. 395/155, 157, 395/158, 159, 161, 164, 160, 162; 345/118, 119, 161

[56] References Cited

U.S. PATENT DOCUMENTS

| 4,774,661 | 9/1988 | Kumpati | 395/600 |
| 4,813,013 | 3/1989 | Dunn | 395/159 |
| 4,862,390 | 8/1989 | Weiner | 395/155 |
| 4,866,638 | 9/1989 | Cosentino et al. | 395/159 |
| 5,040,131 | 8/1991 | Torres | 395/156 |
| 5,196,838 | 3/1993 | Meier et al. | 345/118 |
| 5,212,770 | 5/1993 | Smith et al. | 395/155 |
| 5,333,247 | 7/1994 | Gest et al. | 395/138 |
| 5,371,851 | 12/1994 | Pieper et al. | 395/164 |

FOREIGN PATENT DOCUMENTS 0514307  11/1992  European Pat. Off. .

OTHER PUBLICATIONS

IBM Technical Disclosure Bulletin, vol. 36, No. 06A, Jun. 1993, New York US pp. 109–110.
IBM Technical Disclosure Bulletin, vol. 33, No. 11, Apr. 1991, New York US p. 312.
Derwent Publications Ltd., London, GB; AN TP 49302 'Automatic scrolling within editor or view window in conjunction with scroll bars' (Anonymous) 25 Apr. 1993.

Primary Examiner—Mark R. Powell
Assistant Examiner—Ruay Lian Ho
Attorney, Agent, or Firm—Jeffrey S. LaBaw

[57] ABSTRACT

A technique for transferring a graphical object in a graphical user interface on a computer display from a source window to a target window. It is determined that a graphical object from the source window has entered the target window during a drag and drop operation. Next, it is determined that the graphical object has hit an interior boundary of the target window. The target window is scrolled so long as the graphical object continues to hit the interior boundary. Once the target location is visible in the target window, the graphical object is located at the target location at conclusion of the drag and drop operation. The invention contemplates a graphical user interface in which some target windows are scrollable during a drag and drop operation with a graphical object from a foreign window, while some windows are not. Thus, in a mixed graphical user interface, it must be determined whether the target window is scrollable during a drag and drop operation.

16 Claims, 7 Drawing Sheets

SCROLLING A TARGET WINDOW DURING A DRAG AND DROP OPERATION

BACKGROUND OF THE INVENTION

This invention relates generally to a graphical user interface of a data processing system. More particularly, the invention relates to a technique which determines whether scrolling capability in a target window should be provided during a drag and drop operation.

It is well known to provide a Graphical User Interface (GUI) to allow a user to control a computer system. A graphical user interface is used to present items which may be selected by the user and the results of such selection on the display. In a graphical user interface applications and data files are generally represented by a plurality of graphical objects such as windows or icons. It is known to allow a user to move graphical objects within a window or between windows through a "drag and drop" operation. During a drag and drop operation, the user selects an item such a data file, represented by a graphical object such as an icon by moving the mouse pointer to the graphical object in the interface. Then, one or more buttons on the mouse are depressed and held while the user moves the mouse pointer through the GUI to the desired position. The desired position may simply be for a more aesthically pleasing arrangement of the interface, or, in the case of a transfer between windows, may represent a transfer of data between applications or data files. The user then releases the button or buttons and the graphical object is "dropped" and placed at the new position in the interface. Logical changes are also made as a result of this operation such as storing the new position in the data structures which support the GUI as well as placing the data file represented by the icon into a new file structure, represented by the window to which the icon was moved.

Where the drag and drop operation involves a transfer from window to window and the space allocated for each window is not sufficient to display the entire window user interface, the drag and drop operation is somewhat cumbersome, particularly when the desired location in the target window is not displayed. User can use the scroll bar in target window to move the desired position into the target window's display space. Then, the object to be moved is dragged and dropped from the source location onto the target position. Alternatively, if the target position is not visible in the target window, the icon may be dropped at an arbitrary position in the target window. Then the user may use the scroll bar and drag and drop techniques together to move the icon to the target position.

This invention teaches an improved method of drag-drop operations.

SUMMARY OF THE INVENTION

It is therefore an object of the invention to provide scrolling capability within a drag and drop operation.

It is another object of the invention to provide the scrolling drag and drop operation in an operating system in which the operation is not normally supported.

These objects and others are accomplished by a technique for transferring a graphical object in a graphical user interface on a computer display from a source window to a target window. It is determined that a graphical object from the source window has entered the target window during a drag and drop operation. Next, it is determined that the graphical object has hit an interior boundary of the target window. The target window is scrolled so long as the graphical object continues to hit the interior boundary. Once the target location is visible in the target window, the graphical object is located at the target location at conclusion of the drag and drop operation. The invention contemplates a graphical user interface in which some target windows are scrollable during a drag and drop operation with a graphical object from a foreign window, while some windows are not. Thus, in a mixed graphical user interface, it must be determined whether the target window is scrollable during a drag and drop operation. A scrollable window can be determined to be scrollable either by referring to a class of the target window or by referring to a list of scrollable target windows.

BRIEF DESCRIPTION OF THE DRAWING

This invention will become more easily understood by the following detailed description of the preferred embodiment of the invention with reference to the attached drawings in which.

DETAILED DESCRIPTION OF THE DRAWINGS

The invention may be run on a collection of computers under a number of different operating systems. The computers in the network could be, for example, a personal computer, a mini computer, mainframe computer or a computer running in a distributed network of other computers. Although the specific choice of computer is limited only by disk and disk storage requirements, computers in the IBM PS/2 (TM) series of computers could be used in the present invention. For additional information on IBM's PS/2 series of computers, the reader is referred to *Technical Reference Manual Personal Systems/2* Model 50, 60 systems IBM Corporation, Part No. 68X2224 Order Number S68X-2224 and *Technical Reference Manual Personal Systems/2 Model 80) IBM Corporation* Part No. 68X 2256 Order Number S68X-2254. One operating system which an IBM PS/2 personal computer may run is IBM's OS/2 2.0 (TM). For more information on the IBM OS/2 2.0 Operating System, the reader is referred to OS/2 2.0 *Technical Library, Programming Guide Vol.* 1, 1, 2, 3 Version 2.00 Order Nos. 10G6261, 10G6495, 10G6494.

In the alternative, the computer system might be in the IBM RISC System/6000 (TM) line of computers which run on the AIX (TM) operating system. The various models of the RISC System/6000 are described in many publications of the IBM Corporation, for example, *RISC System/6000, 7073 and 7016 POWERstation and POWERserver Hardware Technical* reference, Order No. SA23-2644-00. The AIX operating system is described in *General Concepts and Procedure—AIX Version 3 for RISC System/6000* Order No.

SC23-2202-00 as well as other publications of the IBM Corporation.

Figure 1:
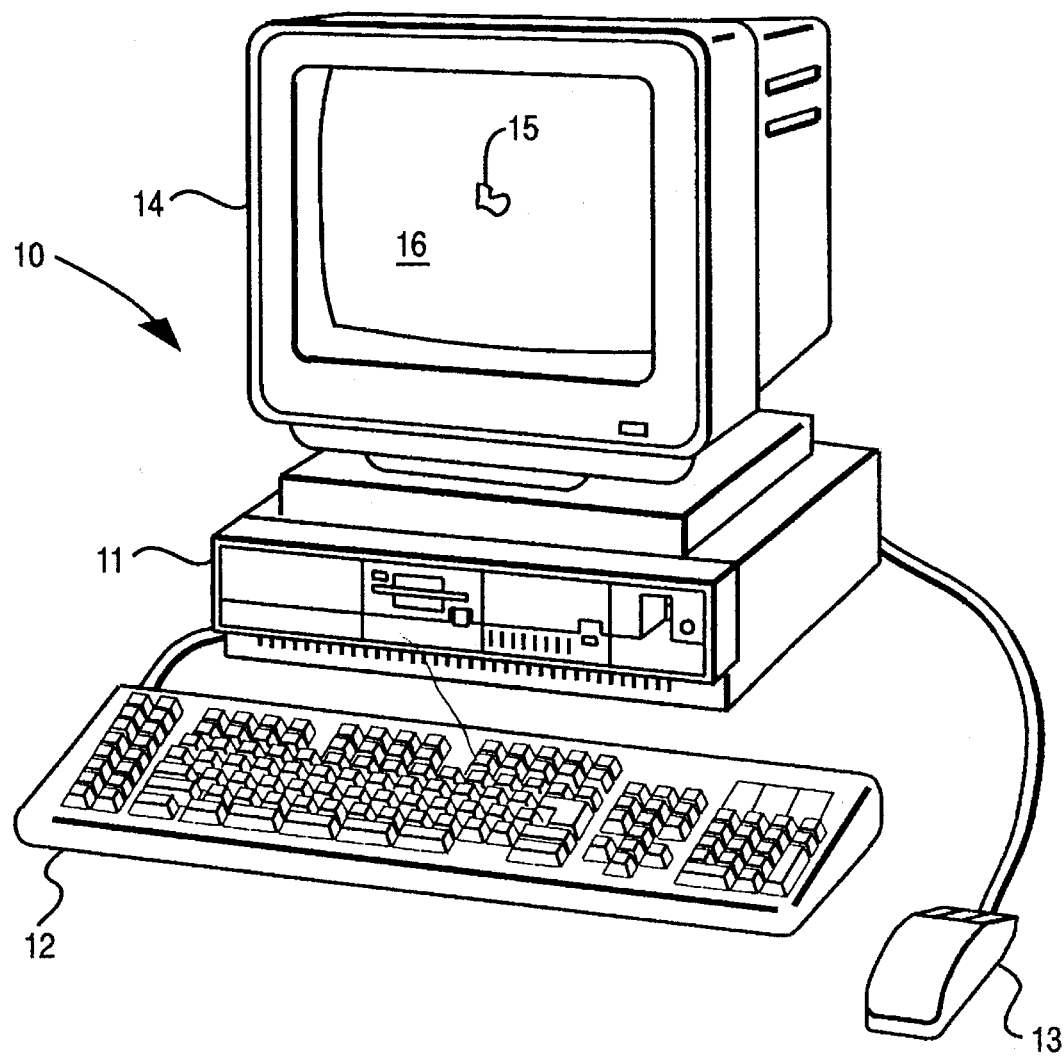
FIG. 1, illustrates a computer comprising, system unit, keyboard, a mouse and a display.

In FIG. 1, a computer 10, comprising a system unit 11, a keyboard 12, a mouse 13 and a display 14 are depicted. The screen 16 of display device 14 is used to present the graphical user interface (GUI). The graphical user interface supported by the operating system allows the user to use a point and shoot method of input, i.e., by moving the mouse pointer 15 to an icon representing a data object at a particular location on the screen 16 and pressing one of the mouse buttons to perform a user command or selection.

Figure 2:
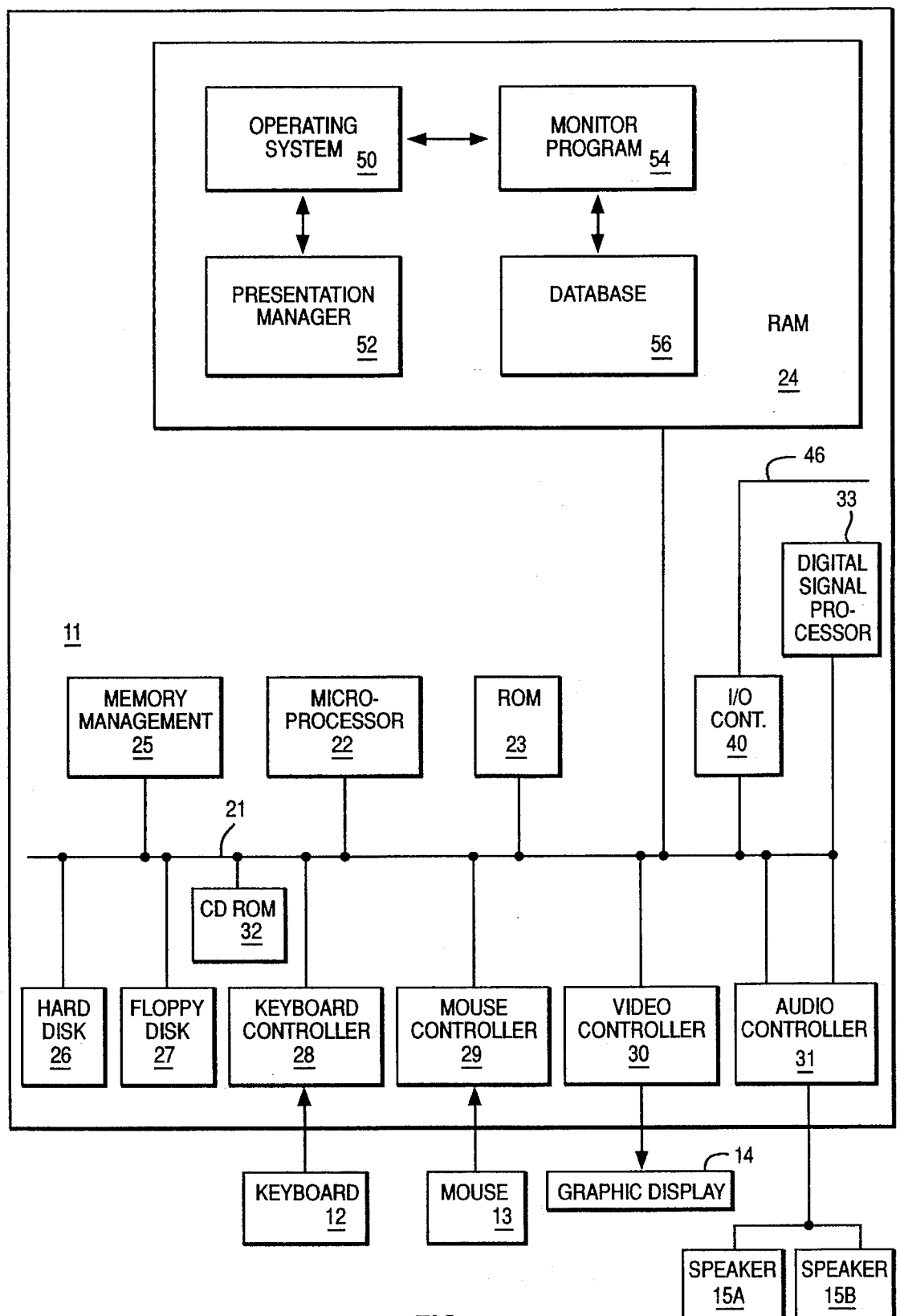
FIG. 2, is an architectural block diagram of a computer illustrated in FIG. 1.

FIG. 2 shows a block diagram of the components of the personal computer shown in FIG. 1. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors. However, other microprocessors including, but not limited to, Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input-Output system (BIOS) which controls basic hardware operations such as the interaction and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32, also coupled to the system bus 21, is used to store a large amount of data, e.g., a multimedia program or large database.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15a and 15b. The speakers 15a and 15b may be used to present audio objects to the user. An I/O controller 40 such as a Token Ring Adapter enables communication over a network 46 to other similarly configured data processing systems.

One of the preferred implementations of the present invention is as a set of instructions in a code module resident in the random access memory 24. Until required by the computer system, the set of instructions may be stored in another computer memory, for example, in the hard disk drive 26, in an optical disk for eventual use in the CD ROM 32 or in a floppy disk for eventual use in the floppy disk drive 27. As shown in the figure, the operating system 50 and presentation manager 52 are resident in RAM 24. In this example, the invention is embodied as an adjunct module onto the operating system. Alternatively, the graphical user interface could be incorporated into a standalone application 54, e.g., a monitor program 54 which monitors a database 56.

Figure 3A:
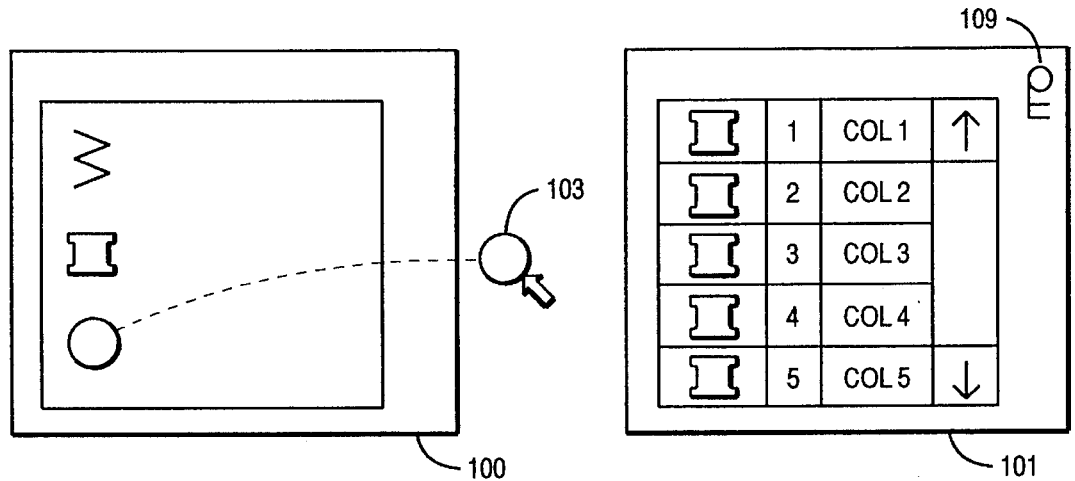
FIG. 3, shows a graphical user interface in which a drag-drop operation according to the principles of the present invention is performed.
Figure 3B:
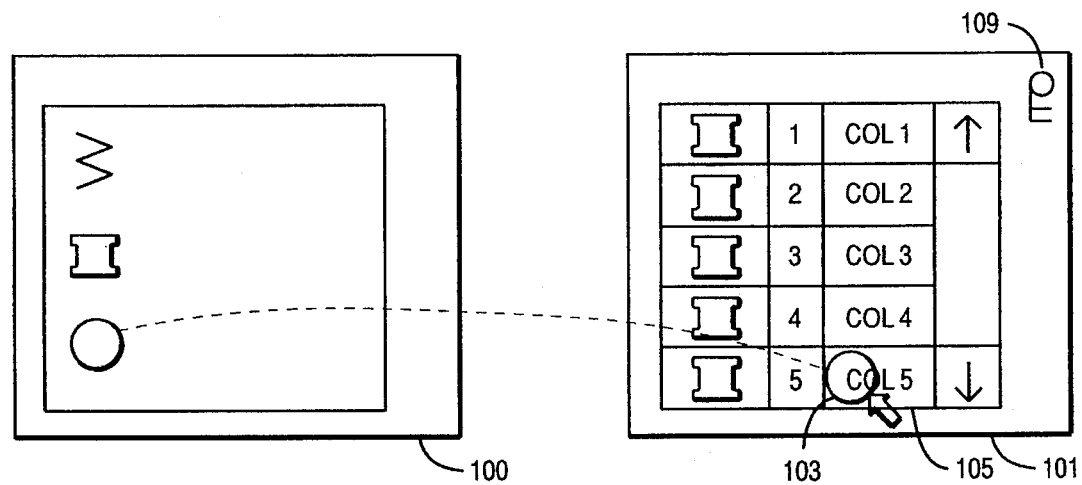
Figure 3C:
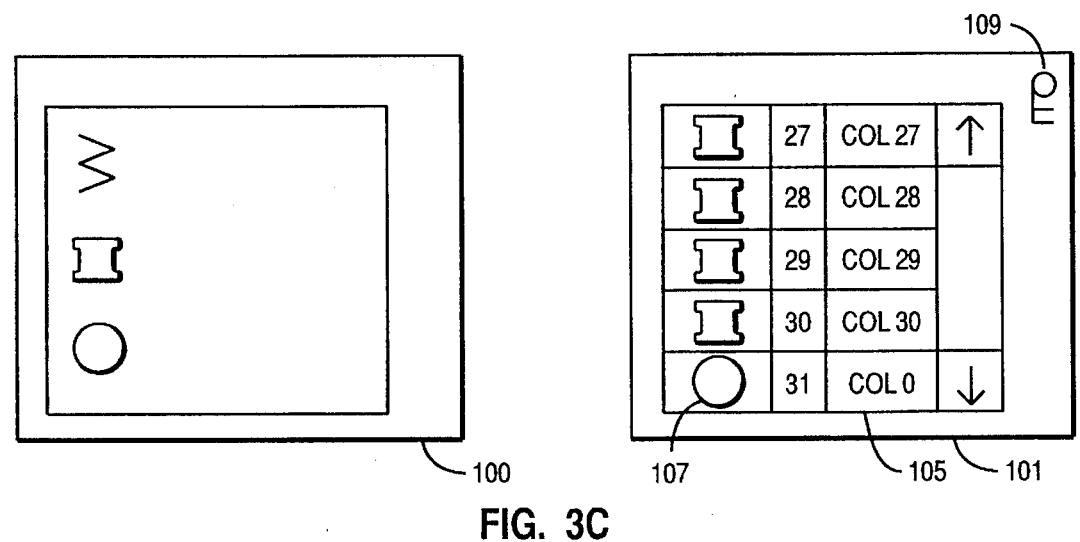

FIGS. 3A, 3B and 3C, illustrate a source and a target window 100, 101. The invention finds particular application in a database where each column of data is represented by an icon. By dragging the icon from source 100 to target window 101 which graphically represent two database tables within the database that column of data is added to the database table represented by the target window 101. In this example, target window 101 has been designated as providing the scrolling capability during the drag-drop operation according to the principles of the invention. The target window may be so designated by a classification of window type in the GUI or by use of the list structure depicted in FIG. 5. Other windows in the GUI may not use the invention behavior if not deemed appropriate by the developer.

As can be seen, in FIG. 3A, the user drags the icon 103 from the source window 100 to the target window 101. As depicted in FIG. 3B, the icon 103 hits the boundary 105 of the target window 101 which causes scrolling until the user finds the target position 107 in the target window as shown in FIG. 3C. The user then drops the icon 103 on this position 107 to complete the operation. The GUI may include an indicia 109 such as an icon which can indicate to the user that the window behaves in this manner. Typically, a mouse is used to perform the drag and drop operation, but those skilled in the art would recognize that other pointing devices such a trackball or stylus could be employed.

FIGS. 4A–4D depict the process of the present invention.

The process begins in step 150 and proceeds to step 151, where a mouse button down event on an icon, in this case a column icon, is detected. In step 153, the variable Source Column is set to the selected column indicated by the mouse button down event and the variable CPos is set to the current mouse position. Next, the system loops in step 155 until the next user input such as a keyboard or mouse event occurs. If the event is a mouse drag event, as detected by step 157, in step 159, the drag operation variables are set. The Drag-Drop variable is set to "on" and the Entered variable is set to "off". The selected column icon is duplicated and displayed at the current mouse position, the variable PPos is set to the mouse position when the drag-drop operation began and CPos is allowed to vary according to the current mouse position.

Figure 4A:
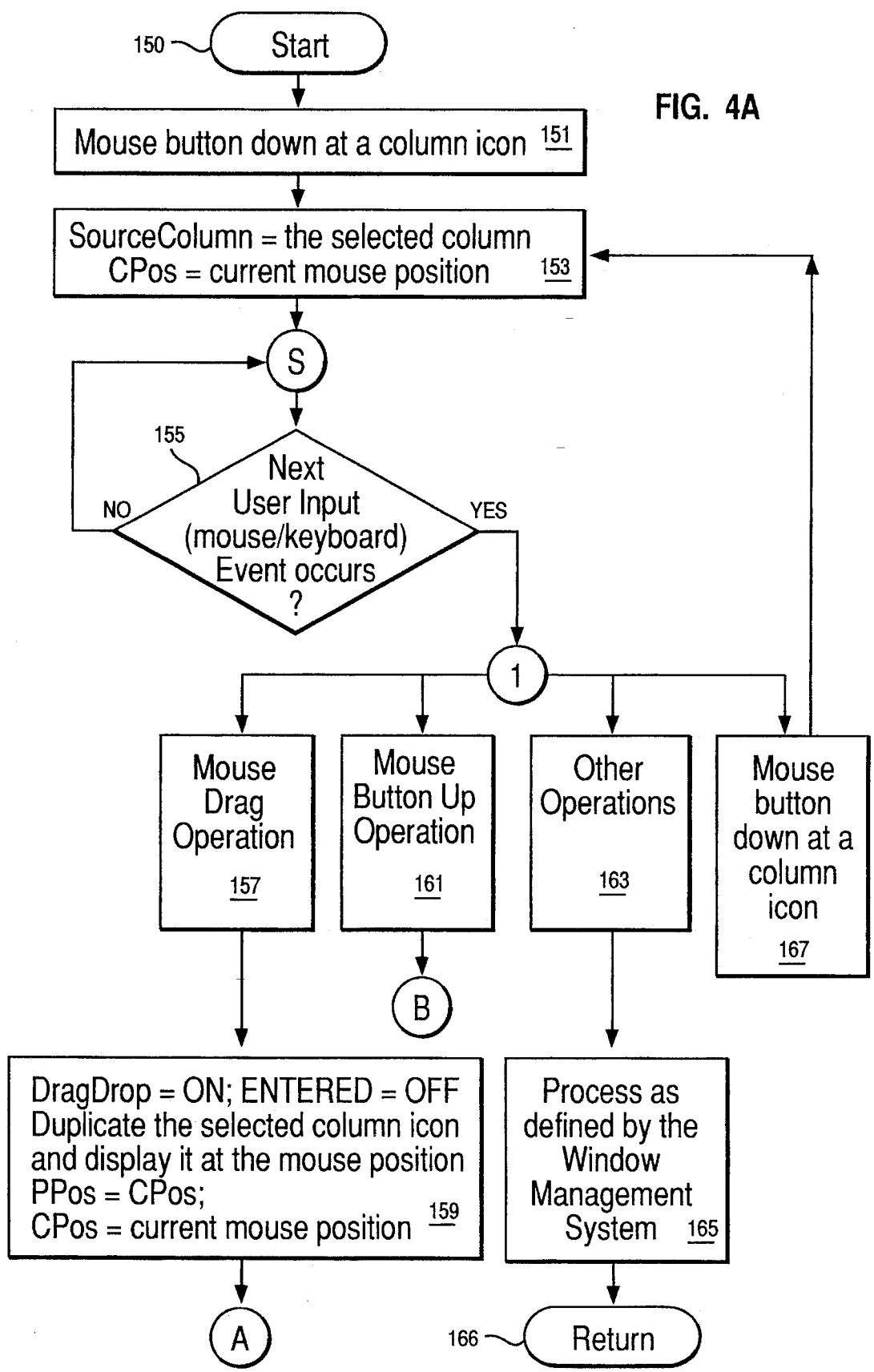
FIGS. 4A–4D, are flowcharts depicting the drag and drop operation according to the principles of the present invention.
Figure 4B:
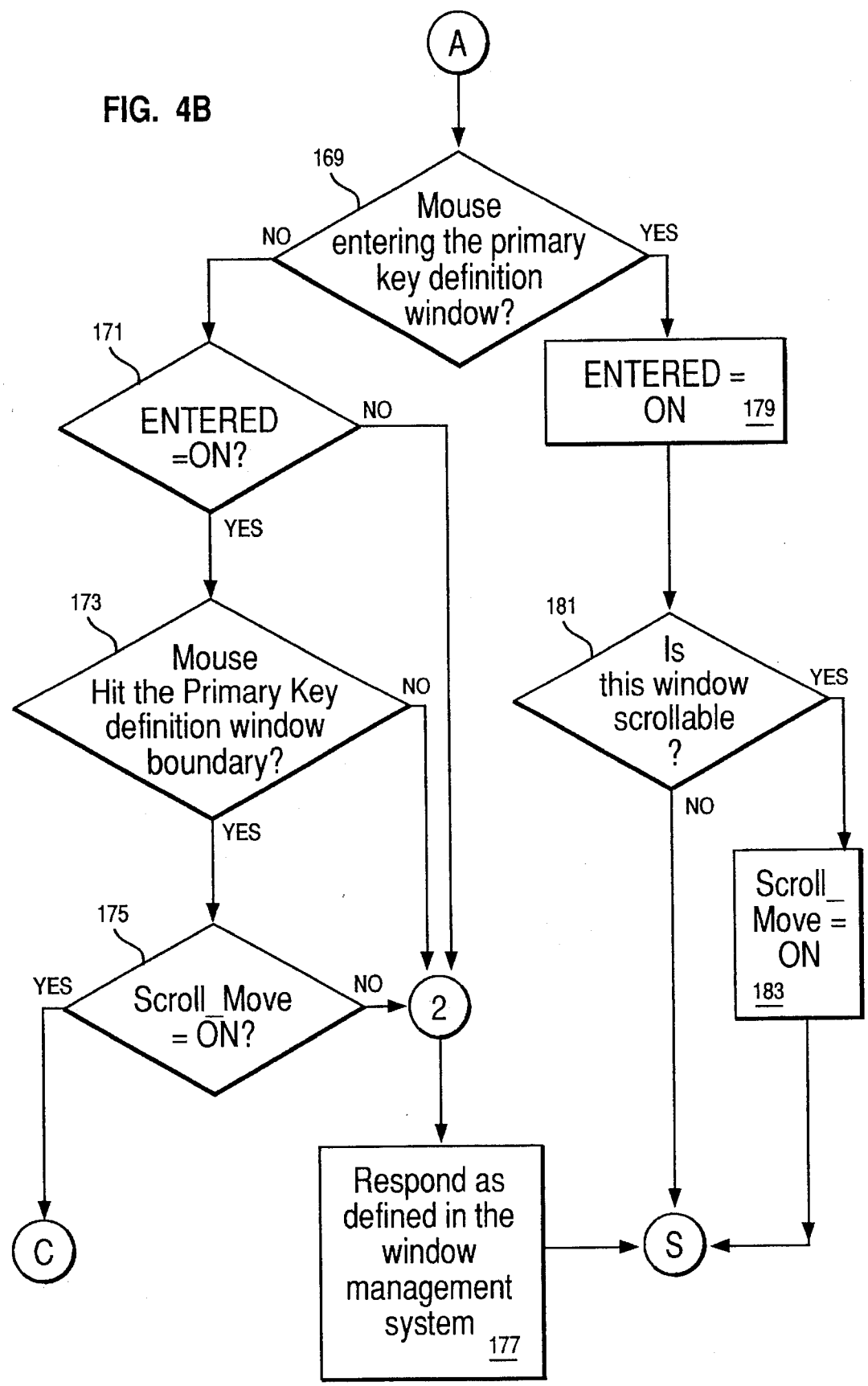

The process continues to FIG. 4B at this point. If a mouse button up event is detected, process proceeds to the flow depicted in FIG. 4C. If there are other types of operations detected in step 163 such as keyboard input the normal default processing is performed by the operating system in step 165. The process returns, step 166. If a mouse button down event at a column icon was detected again indicating selection of a different icon, in step 167, the process returns to step 153 above.

The drag operation is continued where the mouse enters a target window and the mouse pointer hits an inside window boundary. The fact that the mouse is entering a window is determined by the saved position of the mouse position when the drag-drop operation began in the source window and its current position in the target window. The fact that the mouse pointer has hit the window boundary is determined by the coordinates of the current position of the mouse pointer and those of the window boundary. If the test in step 169 determines that the mouse is entering a target window which exhibits the invention's behavior such as the primary key definition window, in step 179, the Entered variable is set to "on". In step 181, a test is performed to determine whether the window is scrollable. The fact that the window is scrollable may be defined by the operating system or by the application developer at the creation of the window. If the window is scrollable, in step 183, the Scroll Move variable is set to "on". At the conclusion of either step 177 or step 183 and where a negative determination is made in step 181, the process returns to the loop at step 155 waiting for the next input event.

As the user continues the drag operation the process will return to step 169, the test performed to determine whether the mouse is entering a target window which exhibits the invention's behavior the primary key definition window will be negative. Therefore, in step 171, a test is performed to determine whether the Entered variable is set to "on". If so, a test in step 173, determines whether the mouse pointer has hit the target window boundary. If the mouse pointer has hit the primary key definition window boundary, in step 175 a test is performed to determine whether the window is scrollable, e.g., if the Scroll_Move variable is "on". If so, the flow continues to FIG. 4D. If the process fails any of these tests, in step 177, the default behavior defined by the operating system is carried out.

Figure 4C:
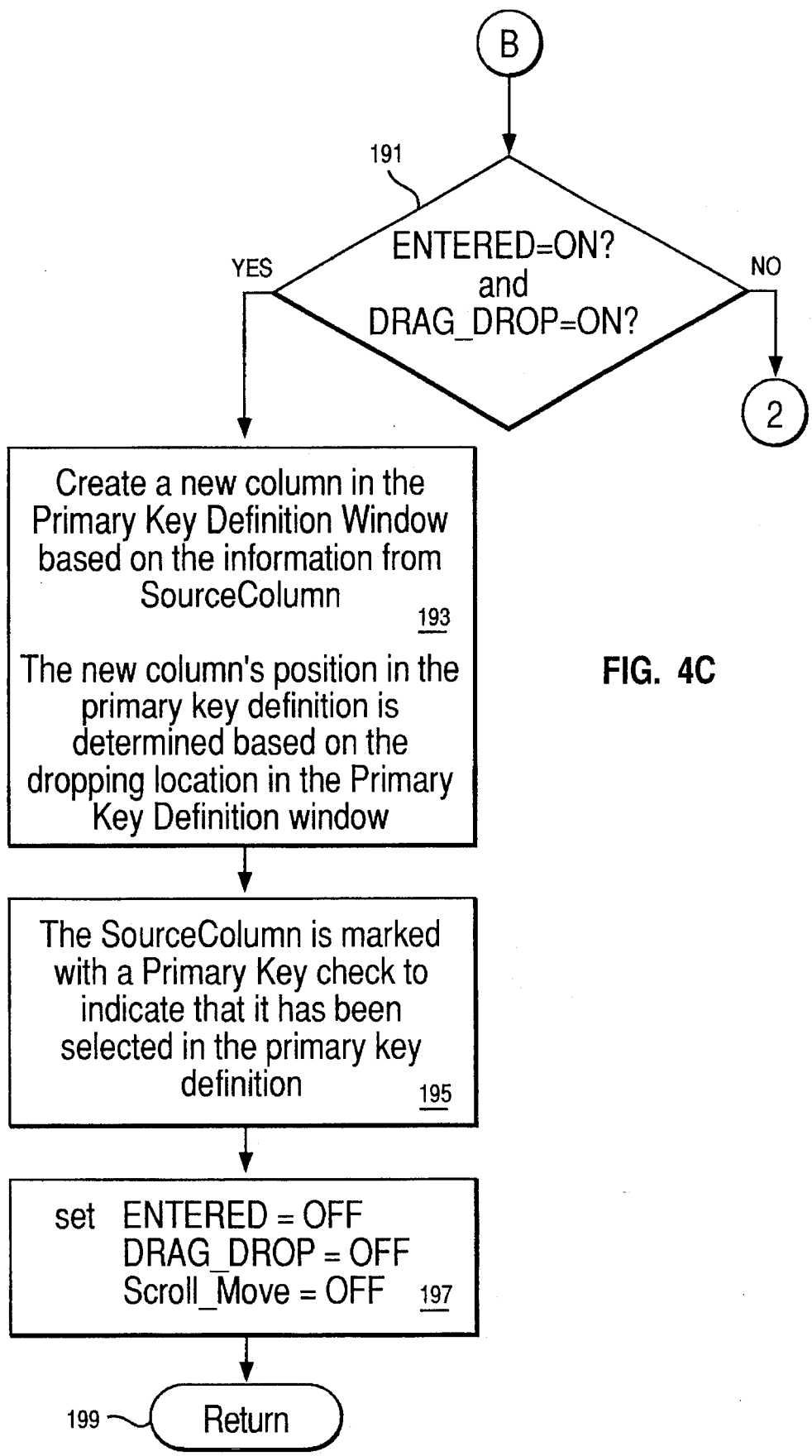

Referring to FIG. 4C, if a mouse button up operation is detected (Step 161, FIG. 4A), in step 191, a test is performed to determine whether the Entered and Drag-Drop variables are set to "on". If they are, it means that the user has dragged an icon into a moveable target window and is now ready to drop that icon on the target position. In step 193, new object is created in the target window such as a new column of data in a database table, based on the information from the selected icon from the source window. New columns of new objects position in the target window is determined based on the dropping location. In step 195, the source object column is marked to indicate that it has been selected. In step 197, the Entered, Drag-Drop, and Scroll move variables are set to "off". The process returns, step 199.

Figure 4D:
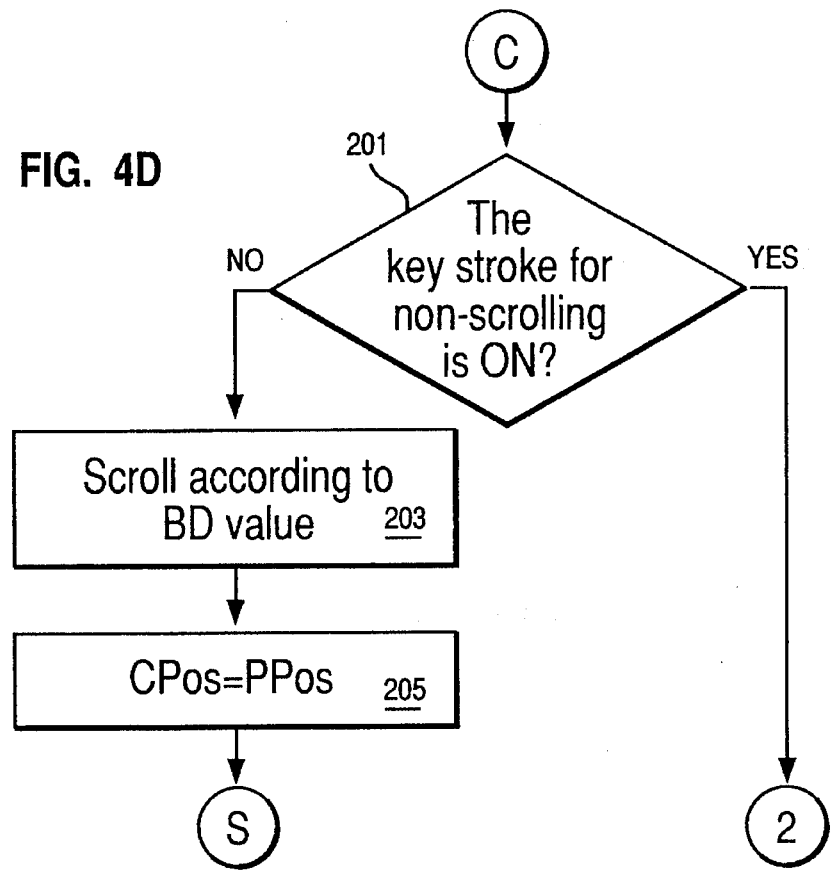

In FIG. 4D, in response to a drag operation in which the tests in steps 171, 173 and 175 have succeeded, the test in step 201 determines whether the keystroke for non-scrolling is on. Step 201 provides an escape mechanism so that the mouse pointer can be dragged out of a target window or an intermediate window located between the source and target windows which also behaves according to the principles of the present invention. If the keystroke for non-scrolling is on, normal operations as defined by the operating system are, performed in step 177. Assuming, however, that the keystroke for nonscrolling is not on, the target window is scrolled according to the boundary value. In step 205, the CPos variable is set to equal PPos, which was the position at the scrolling the drag-drop operation started.

One important key to note in the flow charts above, is setting the mouse position. Usually, the mouse position is known by querying the window management system. However, the previous mouse position must be stored to restrain the real mouse position. When the mouse pointer hits the boundary of a target window, even though the user is dragging the mouse away from the window, the dragging operation will not trigger the redisplay of the mouse icon with the dragging operation while the window is scrolling. Since the mouse position is reset each time, if the mouse is being detected as hitting the window boundary as long as the mouse button is still down, it will be determined as a drag operation, even though there is no mouse movement. The user still has the freedom to move the mouse out of the target window by pressing a predefined key, e.g., the control key, while dragging.

Figure 5:
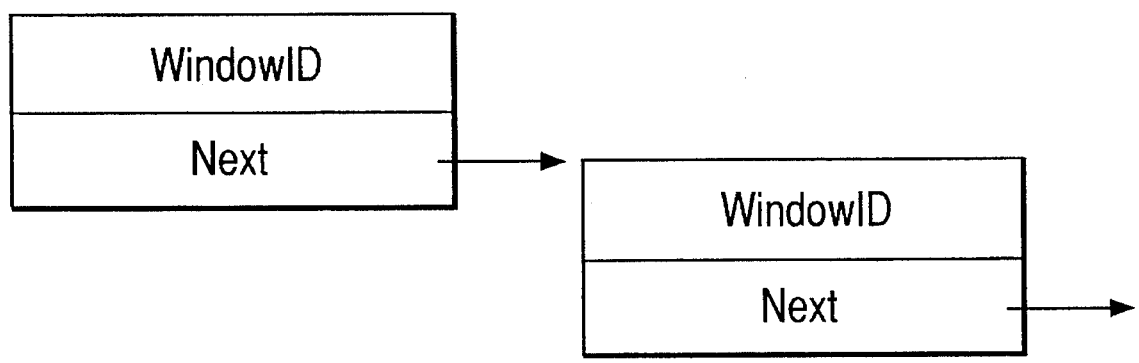
FIG. 5, is a data structure which can be used for identifying the windows which can be selectively scrolled according to the present invention.

The invention can be applied not only to windows of a certain class such as a primary key definition window in the example above, but also those windows which have been selected to have the behavior of the present invention. As long as the window is scrollable, a user may be specify that the method described in this invention should be used when an icon is dragged into it, i.e. scrolling while dragging. The data structure depicted in FIG. 5, is a simple list of window ids with pointers for the next window id in the list. This data structure can be used by the operating system to identify whether the behavior of this invention should be provided. The window id is generally used as a key to access any of the information about a window in most operating systems or window management systems. Thus, the window id will allow the code to access any required information. Any window in the GUI which is neither a designated class of windows nor is in the list structure will exhibit the normal, default behavior of the operating system.

The invention has the advantage over the prior art in direct manipulation techniques can be used more effectively. The user can drag and drop an icon to a target position in a single operation.

While the invention has been described with respect to particular embodiments above, it will be understood by those skilled in the art that modifications may be made without departing from the spirit and scope of the present invention. These embodiments are for purposes of example and illustration only and are not to be taken to limit the scope of the invention narrower than the scope of the appended claims.

We claim:

1. A method for transferring graphical objects in a graphical user interface on a computer display from a source window to a target window, comprising the steps of:

during a first drag and drop operation in a first mode, determining that a first graphical object from the source window has hit an interior boundary of the target window, scrolling the target window so long as the first graphical object continues to hit the interior boundary and locating the first graphical object at a target location at a conclusion of the first drag and drop operation; and during a second drag and drop operation in a second mode, which prevents the scrolling of the target window, dragging a second graphical object from the source window past an interior boundary of the target window.

2. The method as recited in claim 1 wherein the graphical user interface includes both scrollable and nonscrollable windows according to the method recited in claim 1 and the method further comprises the step of determining whether the target window is scrollable during a drag and drop operation where the graphical object originates from a source window.

3. The method as recited in claim 1 further comprising the steps of:

storing an initial position of a pointer at commencement of the drag and drop operation to determine that the graphical object is foreign to the target window; and refreshing a boundary position of the pointer as the foreign graphical object continues to hit the interior boundary of the target window.

4. The method as recited in claim 2 wherein the target window is determined to be scrollable by referring to a class of the target window.

5. The method as recited in claim 2 wherein the target window is determined to be scrollable by referring to a list of scrollable target windows.

6. A system for transferring a graphical object in a graphical user interface on a computer display from a source window to a target window, comprising:

means for determining whether a drag and drop operation is in a first mode or a second mode;

means for determining that a graphical object from the source window has hit an interior boundary of the target window, means responsive to a determination that the drag and drop operation is in the first mode for scrolling the target window so long as the graphical object continues to hit the interior boundary wherein the graphical object is located at a target location at a conclusion of the drag and drop operation; and means responsive to a determination that the drag and drop operation is in the second mode, which prevents the scrolling of the target window, for dragging the graphical object past the interior boundary of the target window.

7. The system as recited ill claim 6 wherein the graphical user interface includes a set of scrollable windows, some but not all of which are scrollable during a drag and drop operation responsive to a foregin graphical object at an interior boundary and the system further comprises means for determining whether the target window is scrollable during a drag and drop operation responsive to the foreign graphical object being at an interior boundary.

8. The system as recited in claim 6 further comprising:

means for storing an initial position of a pointer at commencement of the drag and drop operation to determine that the graphical object is foreign to the target window; and means for refreshing a boundary position of the pointer as the foreign graphical object continues to hit the interior boundary of the target window.

9. The system as recited in claim 7 wherein the target window is determined to be scrollable by referring to a class of the target window.

10. The system as recited in claim 7 wherein the target window is determined to be scrollable by referring to a list of scrollable target windows.

11. The system as recited in claim 6 which further comprises:

a memory coupled to a system bus for storing sets of instructions to operate the system;

a processor coupled to the system bus to execute the sets of instructions; and a display coupled to the system bus for displaying the graphical user interface.

12. A computer program product in a computer readable memory for transferring a graphical object in a graphical user interface on a computer display from a source window to a target window, comprising:

means for determining whether a drag and drop operation is in a first mode or a second mode;

means for determining that a graphical object from the source window is present at an interior boundary of the target window;

means responsive to a determination that the drag and drop operation is in the first mode for scrolling the target window so long as the graphical object is at the interior boundary wherein the graphical object is located at a target location at a conclusion of the drag and drop operation; and means responsive to a determination that the drag and drop operation is in the second mode, which prevents the scrolling of the target window, for dragging the graphical object past the interior boundary of the target window.

13. The product as recited in claim 12 wherein the graphical user interface contains scrollable windows according to a variety of user interactions and that only some of the scrollable windows scroll responsive to a presence of a foreign graphical object at an interior boundary during a drag and drop operation and the product further comprises means for determining whether the target window is scrollable during a drag and drop operation responsive to a foreign graphical object being at an interior boundary.

14. The product as recited in claim 12 further comprising:

means for storing an initial position of a pointer at commencement of the drag and drop operation to determine that the graphical object is foreign to the target window; and means for refreshing a boundary position of the pointer as the foreign graphical object continues to hit the interior boundary.

15. The product as recited in claim 13 wherein the target window is determined to be scrollable by referring to a class of the target window.

16. The product as recited in claim 13 wherein the target window is determined to be scrollable by referring to a list of scrollable target windows.

* * * * *